Dec. 20, 1966     W. S. COREY     3,292,954
SERVICE CLAMP
Filed April 20, 1965
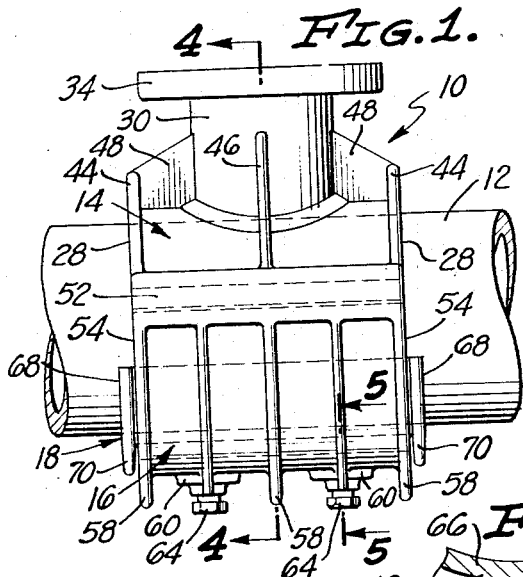
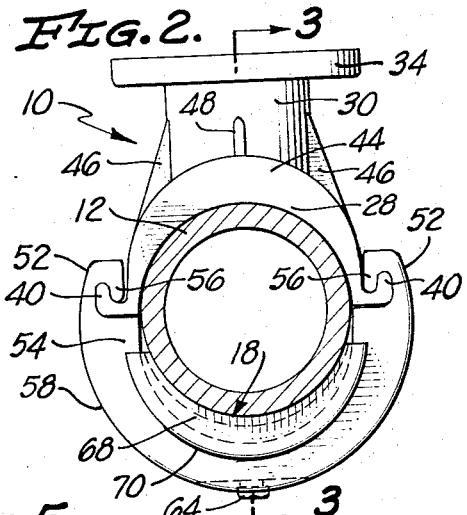
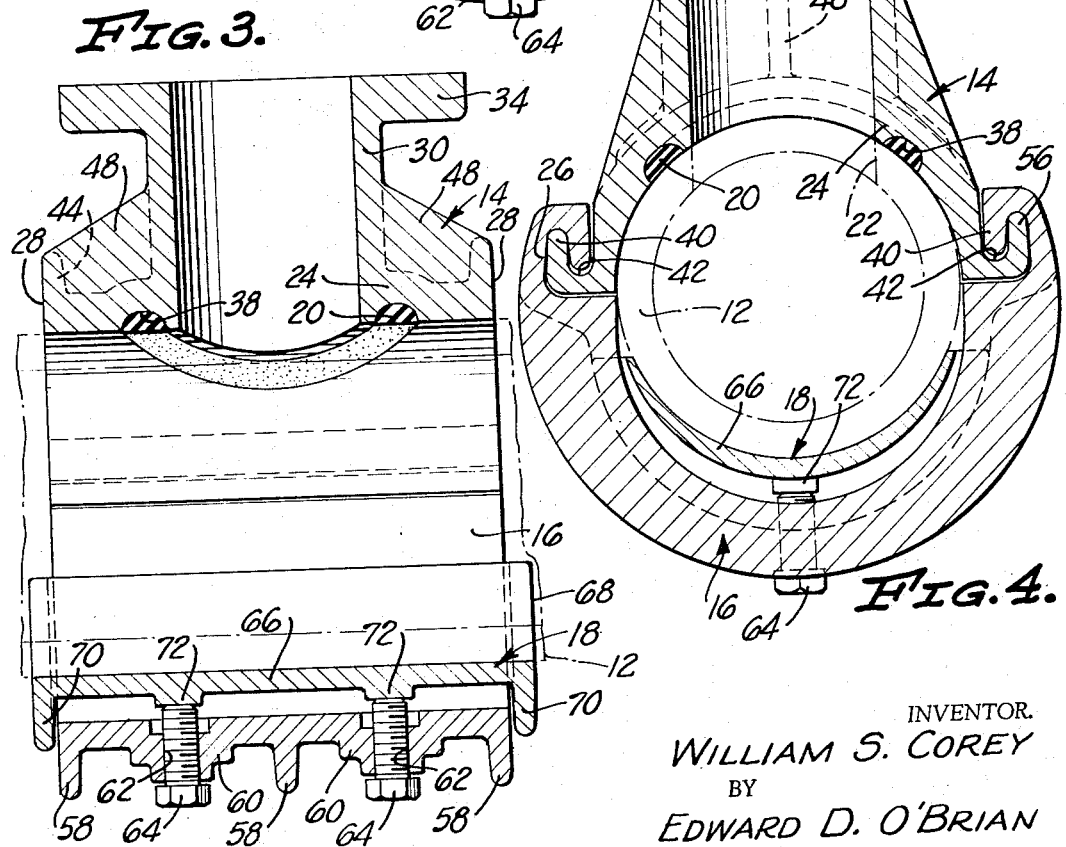
INVENTOR.
WILLIAM S. COREY
BY
EDWARD D. O'BRIAN
ATTORNEYS

United States Patent Office 3,292,954
Patented Dec. 20, 1966

3,292,954
SERVICE CLAMP
William S. Corey, 10236 Mt. Gleason,
Tujunga, Calif. 91042
Substituted for abandoned application Ser. No. 259,006, Feb. 18, 1963. This application Apr. 20, 1965, Ser. No. 450,268
2 Claims. (Cl. 285—198)

This invention pertains to new and improved service clamps. This application is a substitute for abandoned application, Serial No. 259,066, filed February 18, 1963, entitled, "Service Clamp," showing William S. Corey as inventor.

As used herein, the term "service clamp" is employed to designate clamp-like devices which are secured to a pipe or conduit for the purpose of enabling smaller pipes or conduits to be connected to this pipe or conduit. These devices are often referred to by a variety of different names such as tapping sleeves, utility service clamps or fittings, and others.

Devices which may be termed "service clamps" have been known and used virtually since the advent of plumbing of the type presently in use. A large number of different devices of this category have been developed, and many of these devices have been satisfactorily employed. In spite of this there exists a need for new and improved service clamps. To be acceptable a new service clamp must differ from prior related devices in one or more different regards so as to constitute an improvement over such devices.

To be acceptable commercially a service clamp must be relatively inexpensive to manufacture. It must also be comparatively simple in construction so as to avoid any unnecessary tendency toward breakage. Such a clamp should also be constructed in such manner as to be capable of being used without difficulty by comparatively unskilled labor upon pipes or conduits having a comparatively irregular or uneven surface configuration. Such a clamp must also be constructed so as to give satisfactory performance over virtually an indefinite period with fluids at comparatively extreme pressures. Further, an acceptable service clamp must be built so as to use a minimum of material in order to decrease its manufacturing cost as much as possible and in order to enable it to be shipped at a comparatively nominal cost.

Various objects of the present invention are to provide new and improved service clamps having characteristics as are desired for these devices as set out in the preceding paragraph of this specification. Other objects of this invention will be apparent from a detailed consideration of the remainder of this specification, the appended claims and the accompanying drawing in which:

FIG. 1 is a side elevational view showing the use of a service clamp of this invention;

FIG. 2 is an end elevational view showing the use of this service clamp;

FIG. 3 is a cross-sectional view taken at line 3—3 of FIG. 2;

FIG. 4 is a partial cross-sectional view taken at line 4—4 of FIG. 1; and

FIG. 5 is a partial cross-sectional view taken at line 5—5 of FIG. 1.

The accompanying drawing is primarily intended to clearly illustrate a presently preferred embodiment or form of this invention in such a manner as to enable those skilled in the pipe fitting art to clearly understand the nature of this invention. Such individuals will realize from a careful consideration of this drawing and of this specification that various changes of a routine engineering nature may be made in the structure shown without departing from the inventive features defined or summarized in the appended claims.

As an aid to understanding this invention it can be stated in essentially summary form that it concerns utility service clamps, each of which includes a connecting part, a holding part, and a clamping part. The connecting part in a clamp of this invention is formed so as to fit closely against the exterior of a pipe, holds a sealing member and includes a cylindrical extension leading from within the interior of the sealing member to the exterior of the clamp. The holding part is adapted to be hooked onto the connecting part so as to extend around a pipe and carries means which serve to force the clamping part against a pipe into a sealed position with respect to the sealing member.

The various parts of a service clamp of the present invention indicated in the preceding paragraph can be formed out of cast iron or other similar rigid materials such as are commonly used in forming pipe and various conventional types of connecting fixtures. It is also possible to manufacture the connecting part, the holding part and the clamping part used in a service clamp of the present invention out of an inert, rigid plastic such as a recently developed polyformaldehyde resin having properties which are related to those of common metals and alloys used for structural purposes and various other common plastics. From a careful consideration of the service clamp shown in the drawing and described herein it will be apparent that this service clamp has been specifically designed so that it can be manufactured from such plastics, and that its shape and configuration have been developed so as to permit it to be manufactured from either a metal or a plastic material.

This invention is best more fully described with reference to the accompanying drawing showing a service clamp 10 of the present invention in use upon a conventional cylindrical pipe or conduit 12. This clamp 10 includes a connecting part 14, a holding part 16 and a clamping part 18. These parts are assembled with respect to the pipe 12 so that an elastomeric sealing ring 20 held by the connecting part 14 forms a seal around a hole 22 in the pipe 12. This sealing ring 20 is preferably an elastomeric ring such as is commonly referred to as an O-ring which has a circular cross-sectional configuration prior to its being installed in the clamp 10.

The connecting part 14 includes a semi-cylindrical section 24 having side edges 26 and ends 28. A cylindrical lateral section 30 is attached to the section 24 at approximately the middle of this section 24 so as to extend from it in a radial manner. The section 30 carries a radial flange 34 used in connecting the clamp 10 to a lateral pipe (not shown) in a manner which is conventional in the plumbing industry. In the interior of the section 24 around the entrance 36 to the lateral section 30 there is located a smooth wall groove 38. This groove 38 holds the sealing ring 20 previously described during the use of the clamp 10. Along each of the side edges 26 there is located an edge flange 40 defining an edge groove 42. The flanges 40 are of a hook-like configuration, and the grooves 42 face the same general direction as the lateral section 30. A reinforcing web 44 extends between the flanges 40 from the section 24 at each of the ends 28. Other webs 46 extend between the section 30 and the webs 44 and the section 24. Further webs 48 extend between the section 30 and the flanges 40 along the center section 24.

The holding part 16 is of generally U-shaped configuration and includes a center section 50 having the appearance of a three-dimensional U. This section 50 has side edges 52 and ends 54. It is as long as the section 24; the edges 52 are adapted to fit tightly against the edges 26. When these edges are against one another hook-shaped side flanges 56 on the section 50 are adapted to fit around the flanges 40 and the grooves 42 so as to firmly hold the parts 14 and 16 against movement away from one another. The flanges 40 and 66 can be considered as mating flanges since they are of a complementary configuration enabling these two parts to be slid together.

Reinforcing webs 58 are located on the exterior of the section 50 so as to extend completely between the flanges 56 at the ends 54 and at distances equally proportional along the length of the section 56. These webs 58 provide added rigidity to the section 56. Two of the webs 58 are interrupted by enlarged bosses 60 which are provided with internally tapped cylindrical openings 62 leading through the section 50. These openings 62 are located symmetrically along the length of the holding part 16 with respect to the lateral section 30 of the connecting part 14. Each of them carries a half or threaded cap-screw 64 which projects into the interior of the holding part 16.

The clamping part 18 has the general configuration of a part of a cylinder extending slightly less than 360° around the axis of the cylinder. It includes a center section 66 of this configuration and appearance having ends 68. This center section 66 normally lies within the section 50 of the holding part 16 so that its ends 68 are located a short distance beyond the ends 54. In order to prevent the section 66 from slipping past the ends 54 outwardly extending end flanges 70 may be provided upon them. Bosses 72 may be provided on the outer surface of the center section 66 for the purpose of receiving the ends of the cap-screws 64 so as to enable these cap-screws to be tightened during the use of the clamp 10 without deforming the center section 66.

During the use of the clamp 10 the connecting part 14 is first located against a pipe such as the pipe 12 with the sealing ring 20 in position. Then the clamping part 18 is assembled within the holding part 16, and both of these parts 14 and 16 are slid together so as to engage the flanges 40 and 56. At this time this assemblage can be moved with respect to the hole 22 so that the entrance to the lateral section 30 is opposite this hole. The cap-screws 64 can then be tightened down. This forces the clamping part 18 into engagement with the pipe 12 and simultaneously causes a pull to be exerted through the holding part 16 upon the connecting part 14 which results in the sealing ring 20 being deformed so as to form a seal. As this occurs the interior of the section 24 is brought into engagement with the surface of the pipe 12.

From the foregoing it will be seen that this manner of use is comparatively simple. Even an unskilled individual can use a service clamp as herein defined in this manner without difficulty. It will also be apparent from the aforegoing that the clamp 10 can be manufactured at a comparatively nominal cost, and that by virtue of the particular construction described this clamp normally will utilize comparatively little material. The various webs indicated in preceding portions of this specification enable comparatively great pressure to be applied by using the cap-screws 64 without danger of breakage or deformation of the connecting and holding parts 14 and 16.

From a careful consideration of the foregoing it will be apparent that the number of cap-screws used with a service clamp of this invention can be varied in accordance with engineering practice. Thus, if desired, only one of these cap-screws need be employed; where only one is employed it should be located directly opposite the center of the lateral section 30 in order to achieve a balanced type of force distribution. Various other similar changes of an engineering nature may be made in the service clamp shown in the drawing and herein described without departing from the scope of the present invention as defined by the appended claims.

The particular structure of center section 66 of clamping part 18 is such that it becomes thinner at the edges away from the bosses 72. As is illustrated in FIG. 4, the center section 66 is of crescent shape. It is defined by cylindrical surfaces having the same radius which have their axes slightly spaced. The tips of this crescent shape, as best seen in FIG. 4, are cut off somewhat less than a full diameter of the clamping part so that the edges do not become too thin. Aside from providing adequate strength, it is seen that this structure provides some flexibility of center section 66 so that it can engage and clamp more securely a pipe 12 which is slightly off of theoretical diameter. Such flexure, even though slight, permits improved engagement of the clamp part 18 with a pipe 12.

I claim:
1. A service clamp for use with a cylindrical pipe which includes:
   a connecting part, said connecting part including a semi-cylindrical center section having a substantially semi-cylindrical inner surface and a first axis adapted to fit over substantially its entire inner surface in engagement with a pipe, edge flanges at the side edges of said semi-cylindrically center section extending substantially diametrically and upward and extending axially the full length of said connecting part;
   a holding part having a center section of U-shaped cross-sectional configuration having a substantially semi-cylindrical portion having a second axis parallel to and spaced from said first axis and edge flanges, each of which edge flanges extends outward substantially diametrically to said first axis, upward, inward and downward so that it interfits with an edge flange on said connecting part so as to prevent said holding and said connecting parts from moving away from one another;
   a clamping part fitting within said center section of said holding part, said clamping part having a partially cylindrical internal surface having a third axis, said clamping part being capable of bearing against a pipe located between said connecting and said holding parts so that said third axis lies with said first axis, said clamping part having a width at right angles to said third axis almost equal to the diameter of said surface on said connecting part; and
   bolt means threaded on said holding part and extending into engagement with said clamping part so as to be capable of applying pressure to said clamping part in order to force said clamping part into engagement with said pipe.

2. A service clamp for use with a cylindrical pipe which includes:
   a connecting part, said connecting part including a semi-cylindrical center section having a substantially semi-cylindrical inner surface and a first axis adapted to fit over substantially its entire inner surface in engagement with a pipe, a groove located within the interior of said semi-cylindrical section, a sealing ring located within said groove, edge flanges at the side edges of said semi-cylindrical center section extending substantially diametrically and upward and extending axially the full length of said connecting part;
   a holding part having a center section of U-shaped cross-sectional configuration having a substantially semi-cylindrical portion having a second axis parallel to and spaced from said first axis and edge flanges, each of which edge flange extends outward substantially diametrically to said first axis, upward, inward and downward so that it interfits with an edge flange on said connecting part so as to prevent said holding and said connecting parts from moving away from one another;
   a clamping part fitting within said center section of said holding parts, said clamping parts having a partially cylindrical internal surface having a third axis and a partially cylindrical outer surface having a fourth axis, said third and fourth axis being spaced from each other so that said clamping part is thinner at its edges than at its center, said clamping part being capable of bearing against a pipe located between said connecting and said holding parts so that said third axis lies with said first axis, said clamping part having a width at right angles to said third axis almost equal to the diameter of said surface on said connecting part; and bolt means threaded on said holding part and extending into engagement with said clamping part so as to be capable of applying pressure to said clamping part in order to force said clamping part into engagement with said pipe, causing such pipe to deform said sealing ring in the order to form a seal therewith.

References Cited by the Examiner

UNITED STATES PATENTS

| | | | |
|---|---|---|---|
| 250,698 | 12/1881 | Wilson | 285—420 X |
| 607,517 | 7/1898 | Meserve | 285—197 |
| 1,480,936 | 1/1924 | Gonder | 285—197 X |
| 1,737,242 | 11/1929 | Hooley | 285—420 X |
| 1,831,641 | 11/1931 | Skinner | 285—197 |
| 2,332,350 | 10/1943 | Scritchfield | 285—197 X |
| 2,703,721 | 3/1955 | Montgomery | 285—197 |

FOREIGN PATENTS

| | | |
|---|---|---|
| 1,039,004 | 5/1953 | France. |
| 969,783 | 7/1958 | Germany. |
| 934,127 | 8/1963 | Great Britain. |

CARL W. TOMLIN, *Primary Examiner.*

D. W. AROLA, *Assistant Examiner.*